United States Patent
Kim et al.

(10) Patent No.: US 9,491,717 B2
(45) Date of Patent: Nov. 8, 2016

(54) METHOD FOR DETERMINING UPLINK TRANSMISSION POWER IN A NETWORK INCLUDING A PLURALITY OF CELLS, AND APPARATUS THEREFOR

(75) Inventors: Dongcheol Kim, Anyang-si (KR); Jiwoong Jang, Anyang-si (KR); Hangyu Cho, Anyang-si (KR)

(73) Assignee: LG Electronics Inc., Seoul (KR)

( * ) Notice: Subject to any disclaimer, the term of this patent is extended or adjusted under 35 U.S.C. 154(b) by 194 days.

(21) Appl. No.: 14/116,038

(22) PCT Filed: May 7, 2012

(86) PCT No.: PCT/KR2012/003568
§ 371 (c)(1),
(2), (4) Date: Nov. 6, 2013

(87) PCT Pub. No.: WO2012/153962
PCT Pub. Date: Nov. 15, 2012

(65) Prior Publication Data
US 2014/0146750 A1    May 29, 2014

Related U.S. Application Data

(60) Provisional application No. 61/483,071, filed on May 6, 2011.

(51) Int. Cl.
*H04W 52/34* (2009.01)
*H04W 52/24* (2009.01)
(Continued)

(52) U.S. Cl.
CPC ........... *H04W 52/34* (2013.01); *H04W 52/146* (2013.01); *H04W 52/242* (2013.01); *H04W52/244* (2013.01); *H04W 52/283* (2013.01); *H04W 52/343* (2013.01); *H04W 52/346* (2013.01)

(58) Field of Classification Search
CPC ............. H04W 52/34; H04W 52/244; H04W 52/346; H04W 52/343; H04W 52/283; H04W 52/146; H04W 52/242; H04W 52/243
See application file for complete search history.

(56) References Cited

U.S. PATENT DOCUMENTS

2009/0197630 A1\* 8/2009 Ahn et al. ................. 455/522
2009/0286566 A1\* 11/2009 Lindholm ............. H04W 52/10
455/522
(Continued)

FOREIGN PATENT DOCUMENTS

| KR | 10-20060091938 A | 8/2006 |
| KR | 10-20090015508 A | 2/2009 |
| WO | 2011052067 A1 | 5/2011 |

OTHER PUBLICATIONS

MediaTek Inc., Time Shifting and Almost Blank Subframe for Intercellinterference Coordination, Aug. 23-Aug. 27, 2010, 3GPP TSG-RAN WG1 #62, R1-104547.\*

*Primary Examiner* — Joshua Kading
(74) *Attorney, Agent, or Firm* — Dentons US LLP

(57) ABSTRACT

Disclosed is a method for determining uplink transmission power in a network including a plurality of cells, and an apparatus therefor. The method for a terminal to determine uplink transmission power in a network including a plurality of cells may comprise the following steps: receiving information including values of path-loss compensation factors set for each of the plurality of cells; determining uplink transmission power using the value of the path-loss compensation factor corresponding to the cell, from among the plurality of cells, in which the terminal is currently located; and a step of transmitting an uplink signal using the determined transmission power.

9 Claims, 10 Drawing Sheets

(51) Int. Cl.
  *H04W 52/14* (2009.01)
  *H04W 52/28* (2009.01)

(56) References Cited

U.S. PATENT DOCUMENTS

| | | | |
|---|---|---|---|
| 2011/0086663 A1* | 4/2011 | Gorokhov et al. | 455/522 |
| 2011/0195735 A1* | 8/2011 | Irmer | H04W 52/346 455/509 |
| 2011/0235584 A1* | 9/2011 | Chen et al. | 370/328 |
| 2012/0122472 A1* | 5/2012 | Krishnamurthy | H04L 5/0053 455/456.1 |
| 2012/0157108 A1* | 6/2012 | Boudreau et al. | 455/450 |
| 2013/0021929 A1* | 1/2013 | Kim | 370/252 |
| 2013/0225226 A1* | 8/2013 | Manssour | H04W 52/242 455/522 |
| 2014/0112403 A1* | 4/2014 | Falconetti et al. | 375/260 |
| 2014/0295909 A1* | 10/2014 | Ouchi et al. | 455/522 |

\* cited by examiner

FIG. 5
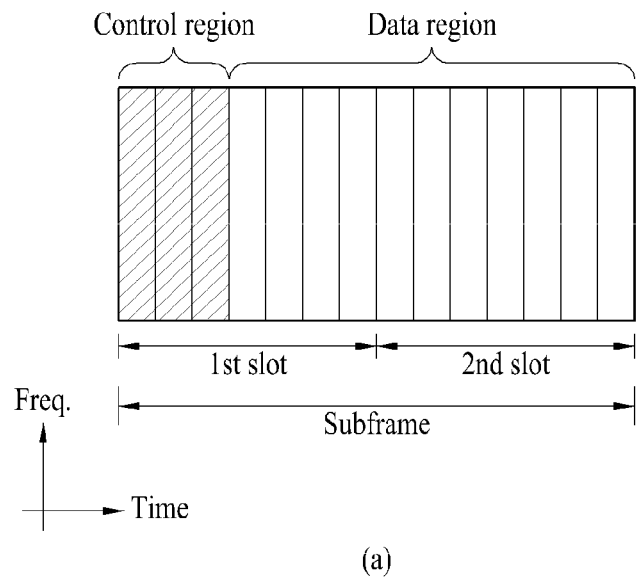
(a)
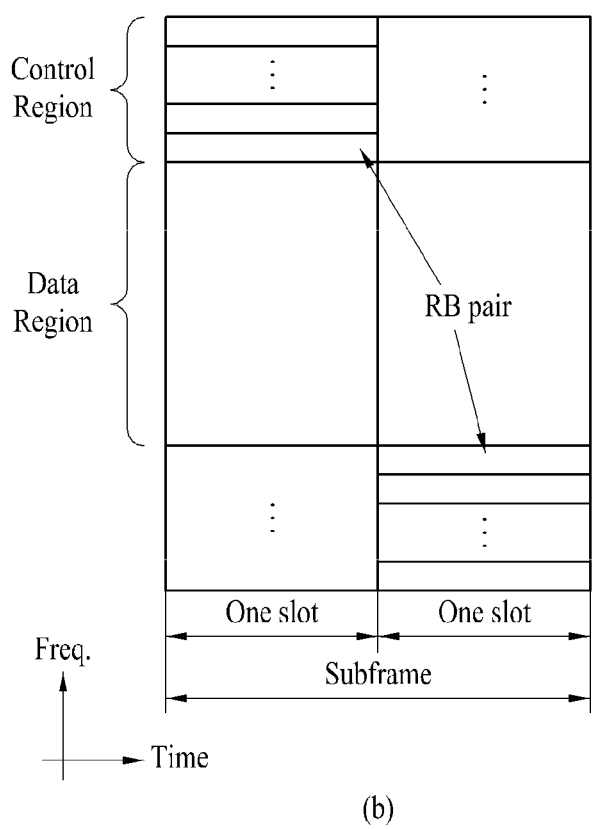
(b)

FIG. 7
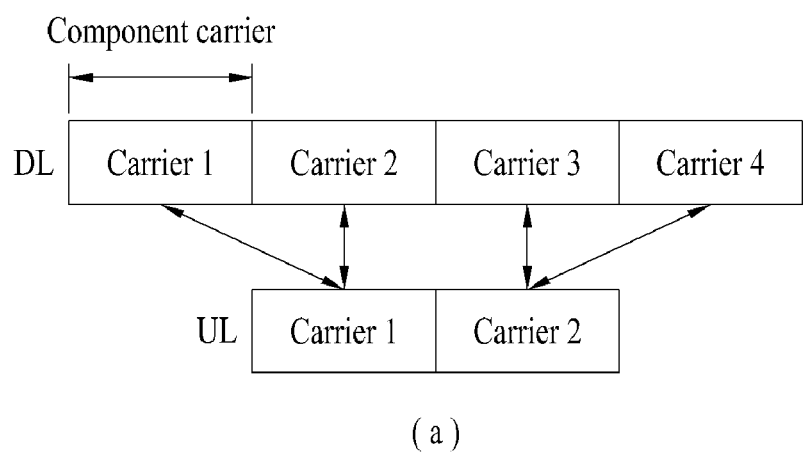
(a)
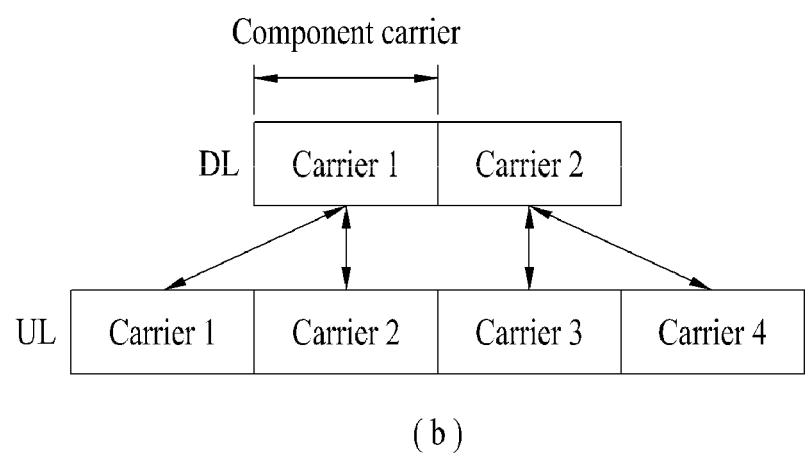
(b)

METHOD FOR DETERMINING UPLINK TRANSMISSION POWER IN A NETWORK INCLUDING A PLURALITY OF CELLS, AND APPARATUS THEREFOR

This Application is a 35 U.S.C. §371 National Stage Entry of International Application No. PCT/KR2012/003568, filed May 7, 2012 and claims the benefit of U.S. Provisional Application No. 61/483,071, filed May 6, 2011, all of which are incorporated by reference in their entirety herein.

TECHNICAL FIELD

The present invention relates to a wireless communication, and more particularly, to a method of determining uplink transmit power in a network including a plurality of cells and an apparatus therefor.

BACKGROUND ART

3GPP LTE ($3^{rd}$ generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system.

E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "$3^{rd}$ generation partnership project; technical specification group radio access network", respectively.

Referring to FIG. 1, E-UMTS includes a user equipment (UE), a base station (BS), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One base station contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. A base station controls data transmissions/receptions to/from a plurality of the user equipments. For a downlink (hereinafter abbreviated DL) data, the base station informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the base station informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between base stations. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA (wideband code division multiple access). Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of a user equipment and the like are required for the future competitiveness.

Recently, ongoing standardization of the next technology of LTE is performed by 3GPP. Such technology shall be named LTE-A in the present specification. One of main differences between LTE system and LTE-A system may include a system bandwidth difference and an adoption of a relay node.

The goal of LTE-A system is to support maximum 100 MHz wideband. To this end, LTE-A system uses carrier aggregation or bandwidth aggregation to achieve the wideband using a plurality of frequency blocks.

According to the carrier aggregation, pluralities of frequency blocks are used as one wide logical frequency band to use wider frequency band. A bandwidth of each frequency block may be defined based on a bandwidth of a system block used by LTE system. Each frequency block is transmitted using a component carrier.

DISCLOSURE OF THE INVENTION

Technical Task

A technical task intended to achieve by the present invention is to provide a method of determining uplink transmit power, which is determined by a user equipment in a network including a plurality of cells.

Another technical task intended to achieve by the present invention is to provide a user equipment determining uplink transmit power in a network including a plurality of cells.

Technical tasks obtainable from the present invention are non-limited the above mentioned technical tasks. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of determining an uplink transmit power by a user equipment in a network including a plurality of cells, includes receiving information including a pathloss compensation factor value set for each of a plurality of the cells, determining an uplink transmit power using the pathloss compensation factor value corresponding to a cell at which the user equipment is currently positioned among each of the plurality of the cells, and transmitting an uplink signal using the determined transmit power. A plurality of the cells includes a heterogeneous cell and the set pathloss compensation factor value may be different from each other between the heterogeneous cells. The pathloss compensation factor value set for each of the cells may be configured in accordance with the cells based on a resource allocation pattern for each of the cells. The pathloss compensation factor value set for each of the cells may be configured with a specific time unit in each of the cells. The specific time unit includes a frame, a subframe, or a symbol unit. The uplink transmit power may correspond to a transmit power to for a PUSCH (physical uplink shared channel) transmission and the pathloss compensation factor value set for each of the plurality of the cells may be set further based on whether each of the cells corresponds to an isolated cell.

The method may further include receiving information on the resource allocation pattern for each of the cells. The resource allocation pattern for each of the cells may include at least one an ABS (almost blanking subframe) assignment pattern information for each of the cells, information on PUSCH (physical uplink shared channel) transmission resource for each of the cells, and information on PUCCH transmission resource for each of the cells.

To further achieve these and other advantages and in accordance with the purpose of the present invention, according to a different embodiment, a user equipment for determining an uplink transmit power in a network including a plurality of cells includes a receiver configured to receive information including a pathloss compensation factor value set for each of a plurality of the cells, a processor configured to determine an uplink transmit power using the pathloss compensation factor value corresponding to a cell at which the user equipment is currently positioned among each of a plurality of the cells, and a transmitter configured to transmit an uplink signal using the determined transmit power. The pathloss compensation factor value set for each of the cells may be configured in accordance with the cells based on a resource allocation pattern for each of the cells.

The receiver is configured to further receive information on the resource allocation pattern for each of the cells and the resource allocation pattern for each of the cells may include at least one an ABS (almost blanking subframe) assignment pattern information for each of the cells, PUSCH (physical uplink shared channel) transmission resource according to the cells, and information on PUCCH transmission resource for each of the cells.

Advantageous Effects

According to various embodiments, performance of a pico cell, an RRH, a femto cell can be maximized in a situation that an eICIC is taken into account.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 5 is a diagram for a downlink subframe structure of 3GPP LTE system as one example of a wireless communication system;

FIG. 7 is a diagram for an example of a carrier aggregation (CA) communication system;

BEST MODE

Mode for Invention

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE/LTE-A system, they are applicable to other random mobile communication systems except unique features of 3GPP LTE/LTE-A system.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS), and the like. And, assume that a base station is a common name of such a random node of a network stage communicating with a terminal as a Node B, an eNode B, a base station (BS), an access point (AP) and the like.

In a mobile communication system, a user equipment may be able to receive information from a base station in downlink and transmit the information to the base station in uplink. The informations transmitted or received by user equipment may include data and various control informations. And, various kinds of physical channels may exist in accordance with types and usages of the informations transmitted or received by the user equipment.

Figure 1:
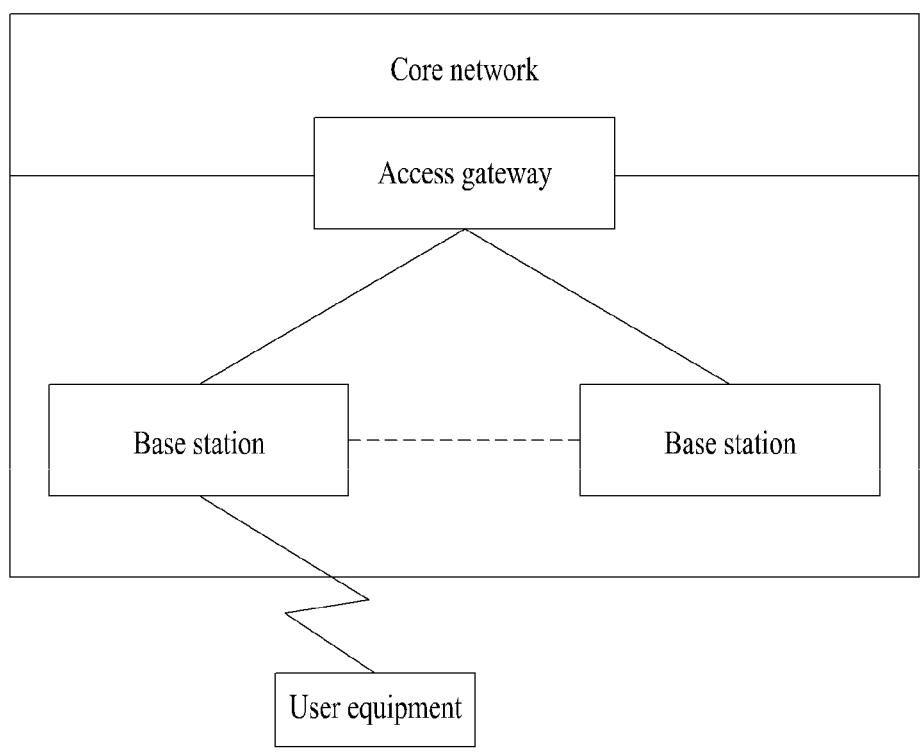
FIG. 1 is a schematic diagram of E-UMTS network structure as one example of a wireless communication system.
Figure 2:
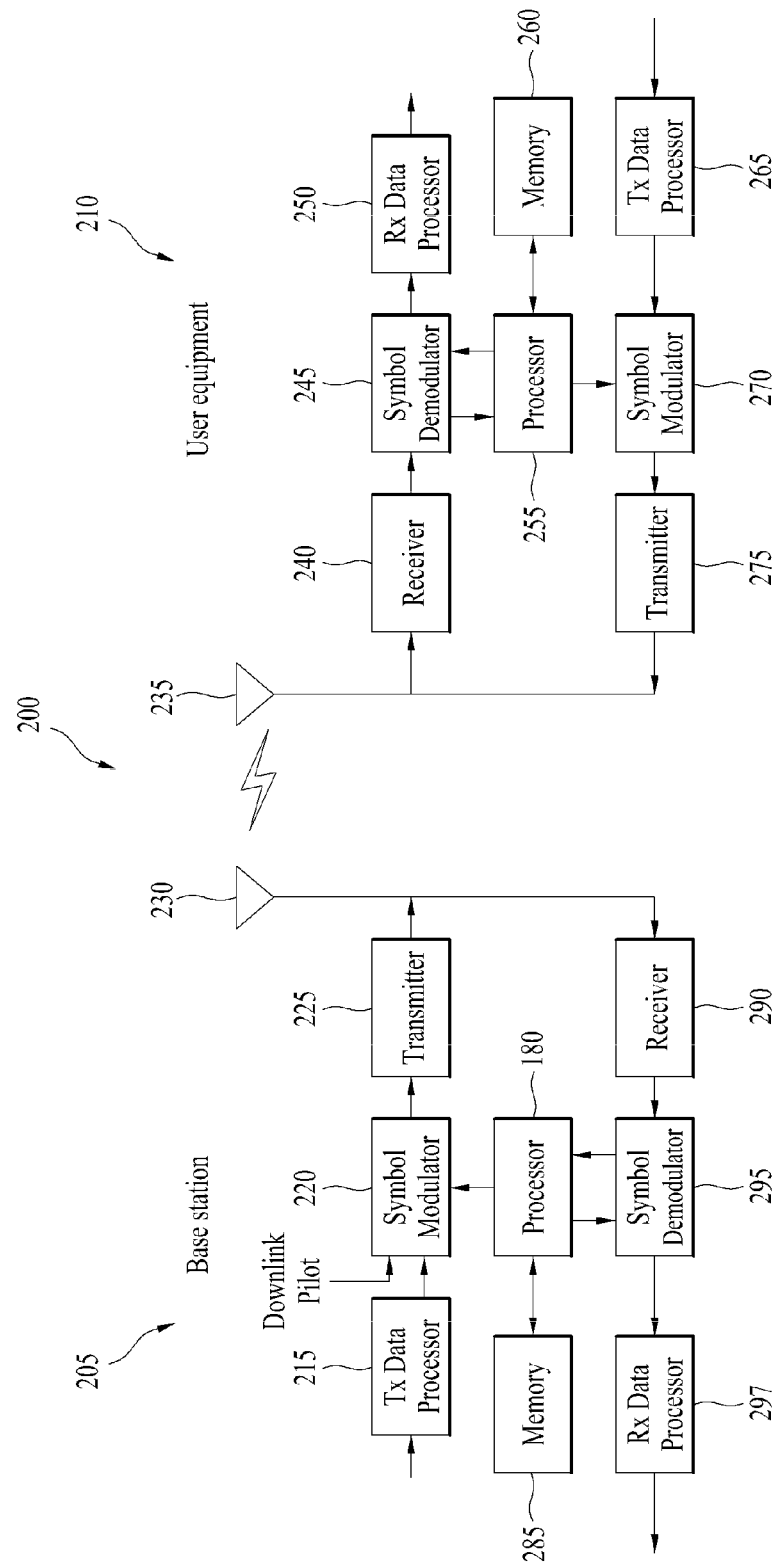
FIG. 2 is a block diagram for configurations of a base station 205 and a user equipment 210 in a wireless communication system 200.

FIG. 2 is a block diagram for configurations of a base station 205 and user equipment 210 in a wireless communication system 200.

Although one base station 205 and one user equipment 210 are shown in the drawing to schematically represent a wireless communication system 200, the wireless communication system 200 may include at least one base station and/or at least one user equipment.

Referring to FIG. 2, a base station 205 may include a transmitted (Tx) data processor 215, a symbol modulator 220, a transmitter 225, a transceiving antenna 230, a processor 280, a memory 285, a receiver 290, a symbol demodulator 295 and a received data processor 297. And, a user equipment 210 may include a transmitted (Tx) data processor 265, a symbol modulator 270, a transmitter 275, a transceiving antenna 235, a processor 255, a memory 260, a receiver 240, a symbol demodulator 255 and a received data processor 250. Although it is depicted that the base station 205 and the user equipment 210 include one antenna 230/235, respectively in the drawing, each of the base station 205 and the user equipment 210 includes a plurality of antennas. Hence, the base station 205 and the user equipment 210 according to the present invention support an MIMO (multiple input multiple output) system. And, the base station 205 according to the present invention may support both a SU-MIMO (single user-MIMO) and an MU-MIMO (multi user-MIMO) scheme.

In downlink, the transmitted data processor 215 receives traffic data, formats the received traffic data, codes the traffic data, interleaves the coded traffic data, modulates (or symbol maps) the interleaved data, and then provides modulated symbols ('data symbols'). The symbol modulator 220 provides a stream of symbols by receiving and processing the data symbols and pilot symbols.

The symbol modulator 220 multiplexes the data symbols and the pilot symbols together and then transmits the multiplexed symbols to the transmitter 225. In doing so, each of the transmitted symbols may include the data symbol, the pilot symbol or a signal value of zero (i.e., null). In each of symbol durations, the pilot symbols may be contiguously transmitted. In doing so, the pilot symbols may include symbols of frequency division multiplexing (FDM), orthogonal frequency division multiplexing (OFDM), time division multiplexing (TDM), or code division multiplexing (CDM).

The transmitter 225 receives the stream of the symbols, converts the received stream to at least one or more analog signals, additionally adjusts the analog signals (e.g., amplification, filtering, frequency upconverting, etc.), and then generates a downlink signal suitable for a transmission on a radio channel. Subsequently, the downlink signal is transmitted to the user equipment via the transmitting antenna 230.

In the configuration of the user equipment 210, the receiving antenna 235 receives the downlink signal from the base station and then provides the received signal to the receiver 240. The receiver 240 adjusts the received signal (e.g., filtering, amplification and frequency downconverting), digitizes the adjusted signal, and then obtains samples. The symbol demodulator 245 demodulates the received pilot symbols and then provides them to the processor 255 for channel estimation.

The symbol demodulator 245 receives a frequency response estimated value for downlink from the processor 255, obtains data symbol estimated values (i.e., estimated values of the transmitted data symbols) by performing data modulation on the received data symbols, and then provides the data symbol estimated values to the received (Rx) data processor 250. The received data processor 250 reconstructs the transmitted traffic data by performing demodulation (i.e., symbol demapping, deinterleaving and decoding) on the data symbol estimated values.

The processing by the symbol demodulator 245 and the processing by the received data processor 250 are complementary to the processing by the symbol modulator 220 and the processing by the transmitted data processor 215 in the base station 205, respectively.

Regarding the user equipment 210 in uplink, the transmitted data processor 265 provides data symbols by processing the traffic data. The symbol modulator 270 provides a stream of symbols to the transmitter 275 by receiving the data symbols, multiplexing the received data symbols, and then performing modulation on the multiplexed symbols. The transmitter 275 generates an uplink signal by receiving the stream of the symbols and then, processing the received stream. The generated uplink signal is then transmitted to the base station 205 via the transmitting antenna 235.

In the base station 205, the uplink signal is received from the user equipment 210 via the receiving antenna 230. The receiver 290 obtains samples by processing the received uplink signal. Subsequently, the symbol demodulator 295 provides pilot symbols received in uplink and a data symbol estimated value by processing the obtained samples. The received data processor 297 reconstructs the traffic data transmitted from the user equipment 210 by processing the data symbol estimated value.

The processor 255/280 of the user equipment/base station 210/205 directs operations (e.g., control, adjustment, management, etc.) of the user equipment/base station 210/205. The processor 255/280 may be connected to the memory unit 260/285 configured to store program codes and data. The memory 260/285 is connected to the processor 255/280 to store operating systems, applications and general files.

The processor 255/280 may be called one of a controller, a microcontroller, a microprocessor, a microcomputer and the like. And, the processor 255/280 may be implemented using hardware, firmware, software and/or any combinations thereof. In the implementation by hardware, the processor 255/280 may be provided with one of ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 255/280 or saved in the memory 260/285 to be driven by the processor 255/280.

Layers of a radio protocol between a user equipment and a base station may be classified into $1^{st}$ layer L1, $2^{nd}$ layer L2 and $3^{rd}$ layer L3 based on 3 lower layers of OSI (open system interconnection) model well known to communication systems. A physical layer belongs to the $1^{st}$ layer and provides an information transfer service via a physical channel. RRC (radio resource control) layer belongs to the $3^{rd}$ layer and provides control radio resources between UE and network. A user equipment and a base station may be able to exchange RRC messages with each other via a radio communication network using RRC layers.

Figure 3:
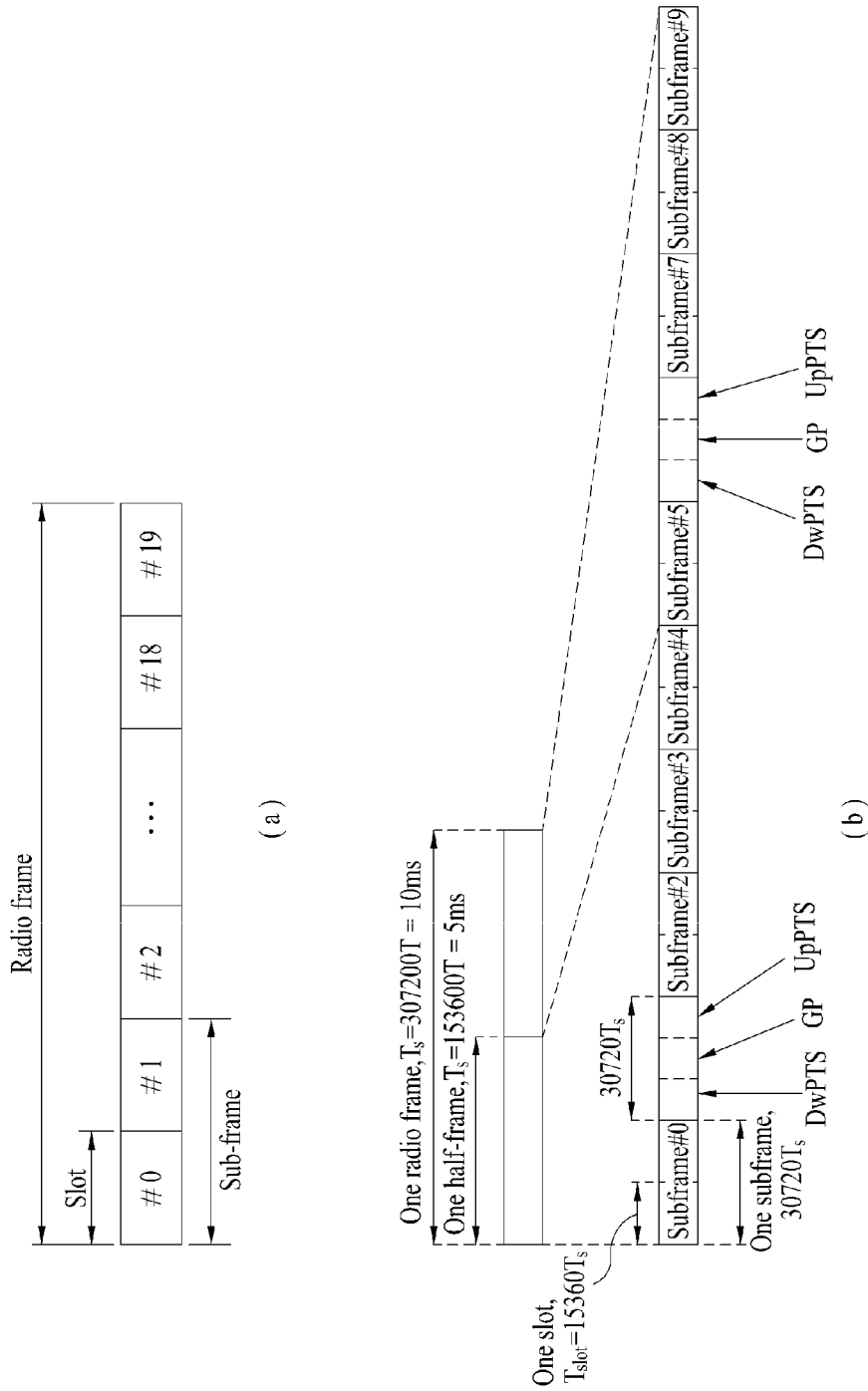
FIG. 3 is a diagram for one example of a radio frame structure used in 3GPP LTE/LTE-A system as one example of a wireless communication system.

FIG. 3 is a diagram for one example of a radio frame structure used in 3GPP LTE/LTE-A system as one example of a wireless communication system.

In a cellular OFDM radio packet communication system, UL/DL (uplink/downlink) data packet transmission is performed by a unit of subframe. And, one subframe is defined as a predetermined time interval including a plurality of OFDM symbols. In the 3GPP LTE standard, a type-1 radio frame structure applicable to FDD (frequency division duplex) and a type-2 radio frame structure applicable to TDD (time division duplex) are supported.

FIG. 3 (a) is a diagram for a structure of a downlink radio frame of type 1. A DL (downlink) radio frame includes 10 subframes. Each of the subframes includes 2 slots. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE system uses OFDM in downlink, OFDM symbol is provided to indicate one symbol interval. The OFDM symbol may be named SC-FDMA symbol or symbol interval. Resource block (RB) is a resource allocation unit and may include a plurality of contiguous subcarriers in one slot.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first maximum 3 OFDM symbols of each subframe may be allocated to PDCCH (physical downlink control channel), while the rest of the OFDM symbols are allocated to PDSCH (physical downlink shared channel).

FIG. 3 (b) is a diagram for a structure of a downlink radio frame of type 2. A type-2 radio frame includes 2 half frames. Each of the half frame includes 5 subframes, a DwPTS (downlink pilot time slot), a GP (guard period), and an UpPTS (uplink pilot time slot). Each of the subframes includes 2 slots. The DwPTS is used for initial cell search, synchronization, or a channel estimation in a user equipment. The UpPTS is used for channel estimation of a base station and matching a transmission synchronization of a user equipment. The guard period is a period for eliminating interference generated in uplink due to multi-path delay of a downlink signal between uplink and downlink.

The above-described structures of the radio frame are exemplary only. And, the number of subframes included in a radio frame, the number of slots included in the subframe and the number of symbols included in the slot may be modified in various ways.

Figure 4:
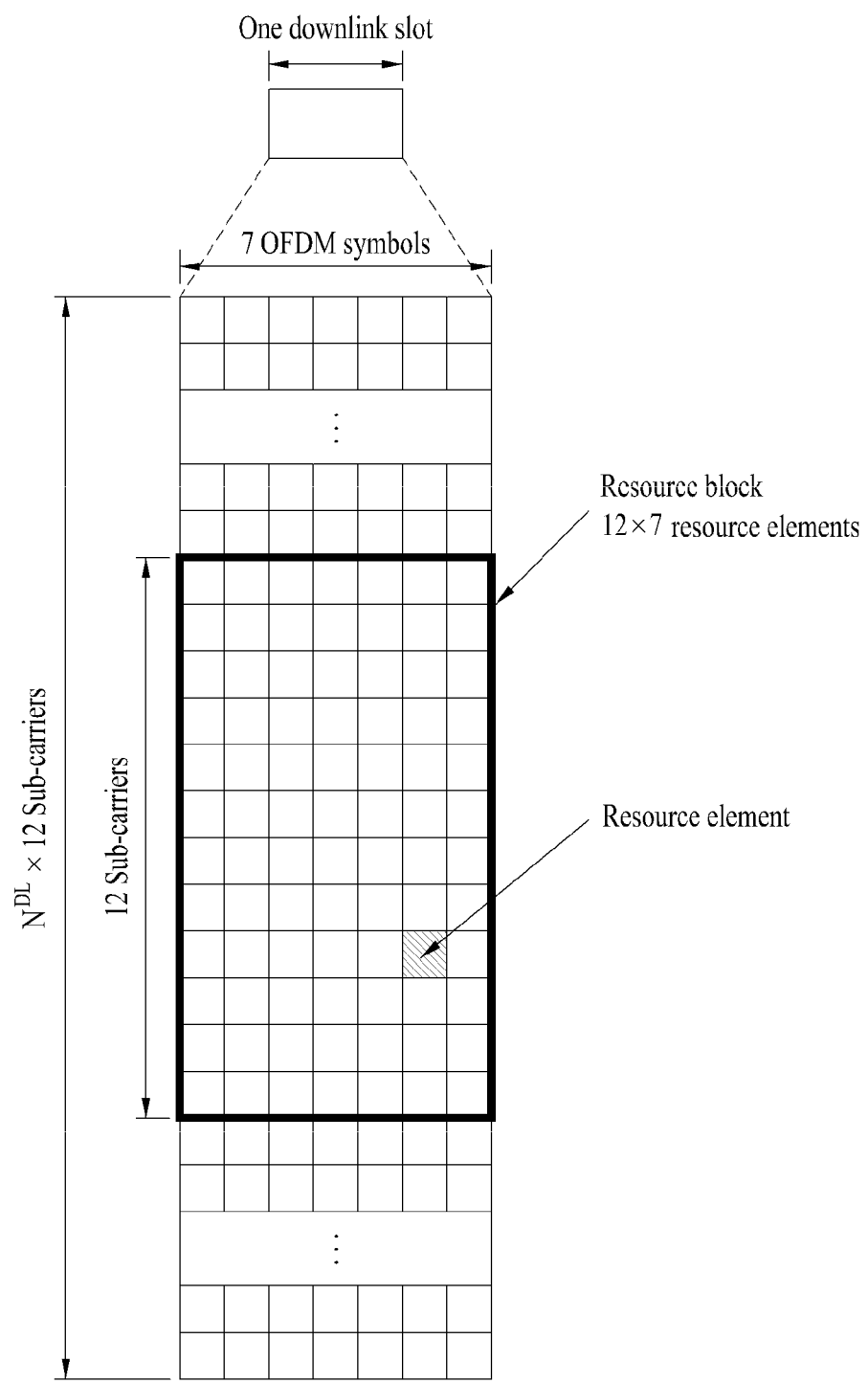
FIG. 4 is a diagram for an example of a resource grid of a downlink slot of 3GPP LTE/LTE-A system as one example of a wireless communication system.

FIG. 4 is a diagram for an example of a resource grid of a downlink slot of 3GPP LTE/LTE-A system as one example of a wireless communication system.

Referring to FIG. 4, one downlink (DL) slot may include a plurality of OFDM symbols in time domain. In particular, one DL slot includes 7 (6) OFDM symbols and one resource block (RB) may include 12 subcarriers in frequency domain. Each element on a resource grid is called a resource element (hereinafter abbreviated RE). One resource block includes 12×7(6) resource elements. The number $N_{RB}$ of resource blocks included in a DL slot may depend on a DL transmission bandwidth. And, the structure of an uplink (UL) slot may be identical to that of the DL slot and an OFDM symbol is replaced with an SC-FDMA symbol.

FIG. 5 is a diagram for a downlink subframe structure of 3GPP LTE system as one example of a wireless communication system.

Referring to FIG. 5, maximum 3(4) fore OFDM symbols of the first slot within a DL subframe correspond to a control region for allocating control channels thereto and the rest of the OFDM symbols correspond to a data region for allocating PDSCH (physical downlink shared channel) thereto. DL (downlink) control channels used in LTE system include PCFICH (physical control format indicator channel), PDCCH (physical downlink control channel), PHICH (physical hybrid-ARQ indicator channel), etc. The PCFICH carried on a first OFDM symbol of a subframe carries the information on the number of OFDM symbols used for the transmission of control channels within the subframe. The PHICH carries HARQ ACK/NACK (hybrid automatic repeat request acknowledgement/negative acknowledgement) signal in response to an UL transmission.

Control information carried on PDCCH may be called downlink control information (DCI: downlink control indicator). A DCI format is defined by a format of 0 for an uplink and the DCI format is defined by formats of 1, 1A, 1B, 1C, 1D, 2, 2A, 3, 3A and the like for a downlink. The DCI format may be able to selectively include a hopping flag, an RB assignment, an MCS (modulation coding scheme), an RV (redundancy version), an NDI (new data indicator), a TPC (transmit power control), a cyclic shift DM RS (demodulation reference signal), a CQI (channel quality information) request, a HARQ process number, a TPMI (transmitted precoding matrix indicator), a PMI (precoding matrix indicator) confirmation and the like according to a usage.

PDCCH is able to carry a transmission format and resource allocation information of DL-SCH (downlink shared channel), a transmission format and resource allocation information of UL-SCH (uplink shared channel), paging information on PCH (paging channel), system information on DL-SCH, resource allocation information of an upper layer control message such as a random access response transmitted on PDSCH, a transmit power control command set for individual user equipments within a user equipment (UE) group, a transmit power control command, activation indication information of VoIP (voice over IP) and the like. A plurality of PDCCHs can be transmitted in a control region and a user equipment is able to monitor a plurality of the PDCCHs. PDCCH is transmitted on a aggregation of a plurality of contiguous control channel elements (CCEs). CCE is a logical assignment unit used to provide PDCCH with a code rate in accordance with a state of a radio channel. CCE corresponds to a plurality of REGs (resource element groups). A format of PDCCH and the number of bits of PDCCH are determined depending on the number of CCEs. A base station determines PDCCH format in accordance with DCI to transmit to a user equipment and attaches CRC (cyclic redundancy check) to control information. The CRC is masked with an identifier (called RNTI (radio network temporary identifier)) in accordance with an owner or usage of PDCCH. If the PDCCH is provided for a specific user equipment, the CRC can be masked with an identifier of the corresponding user equipment, i.e., C-RNTI (i.e., Cell-RNTI). As a different example, if the PDCCH is provided for a paging message, the CRC can be masked with a paging identifier (e.g., P-RNTI (Paging-RNTI)). If the PDCCH is provided for system information, and more particularly, for a system information block (SIB), the CRC can be masked with a system information identifier (e.g., SI-RNTI (system information-RNTI). If the PDCCH is provided for a random access response, the CRC can be masked with RA-RNTI (random access-RNTI).

Figure 6:
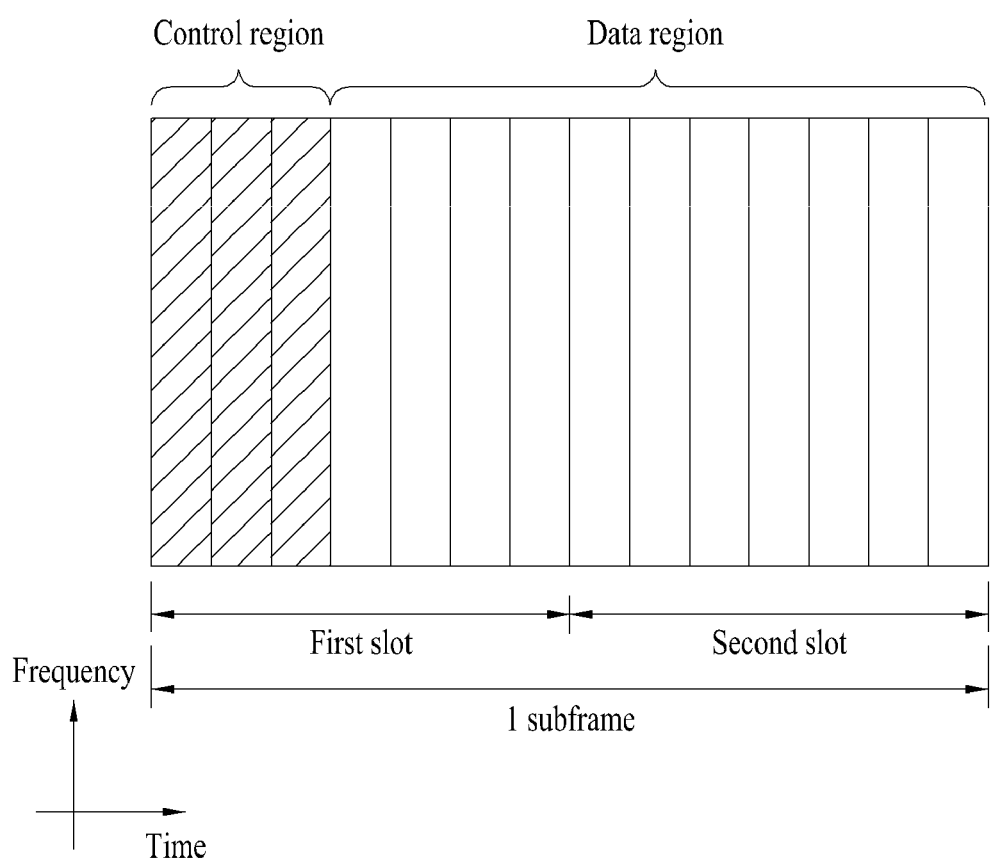
FIG. 6 is a diagram for an uplink subframe structure of 3GPP LTE system as one example of a wireless communication system.

FIG. 6 is a diagram for an uplink subframe structure of 3GPP LTE system as one example of a wireless communication system.

Referring to FIG. 6, an uplink subframe includes a plurality of slots (e.g., 2 slots). A slot may include a different number of SC-FDMA symbols according to a length of CP. A UL subframe may be divided into a control region and a data region in frequency domain. The data region includes PUSCH and can be used for transmitting a data signal such as an audio and the like. The control region includes PUCCH and can be used for transmitting UL control information (UCI). PUCCH includes an RB pair located at both ends of the data region on a frequency axis and hops on a slot boundary.

The PUCCH can be used for transmitting following control information.

SR (scheduling request): information used for making a request for an uplink UL-SCH resource. This information is transmitted using an OOK (on-off keying) scheme.

HARQ ACK/NACK: a response signal for a downlink data packet on PDSCH. This information indicates whether the downlink data packet is successively received. ACK/NACK 1 bit is transmitted in response to a single downlink codeword (CW) and ACK/NACK 2 bits are transmitted in response to two downlink codewords.

CQI (channel quality indicator): feedback information on a downlink channel. MIMO (multiple input multiple output)-related feedback information includes an RI (rank indicator), a PMI (precoding matrix indicator), a PTI (precoding type indicator), and the like. 20 bits per subframe are used for this information.

An amount of control information capable of being transmitted by a UE in a subframe can be determined according to the number of SC-FDMA symbol available to transmit the control information. The SC-FDMA available for transmitting the control information means a remaining SC-FDMA symbol except an SC-FDMA symbol used for transmitting a reference signal (RS) in a subframe. In case of a subframe to which an SRS (sounding reference signal) is configured thereto, a last SC-FDMA symbol of the subframe is excluded as well. A reference signal is used to detect coherent of PUCCH. PUCCH supports 7 formats depending on transmitted information.

Table 1 indicates a mapping relation between a PUCCH format and a UCI in LTE.

TABLE 1

| PUCCH format | UL control information (UCI) |
| --- | --- |
| Format 1 | SR (scheduling request) (un-modulated wave) |
| Format 1a | 1-bit HARQ ACK/NACK (SR existence/non-existence) |
| Format 1b | 2-bit HARQ ACK/NACK (SR existence/non-existence) |
| Format 2 | CQI (20 coded bits) |
| Format 2 | CQI and 1- or 2-bit HARQ ACK/NACK (20 bits) (only applied to extended CP) |
| Format 2a | CQI and 1-bit HARQ ACK/NACK (20 + 1 coded bits) |
| Format 2b | CQI and 2-bit HARQ ACK/NACK (20 + 2 coded bits) |

FIG. 7 is a diagram for an example of a carrier aggregation (CA) communication system.

LTE-A system uses a carrier aggregation (or bandwidth aggregation) technique using a wider uplink/downlink bandwidth in a manner of collecting a plurality of uplink/downlink frequency bandwidths to use a wider frequency bandwidth. Each of small frequency bandwidths is transmitted using a component carrier (CC). The component carrier can be comprehended as a carrier frequency (or, a center carrier, a center frequency) for a corresponding frequency block.

Each of the component carriers can be contiguous or non-contiguous with each other in frequency domain. Bandwidth of the CC can be limited to the bandwidth of a legacy system for a backward compatibility with the legacy system. For instance, a legacy 3GPP LTE supports a bandwidth of 1.4 MHz, 3 MHz, 5 MHz, 10 MHz, 15 MHz, and 20 MHz and LTE-A may be able to support a bandwidth bigger than 20 MHz in a manner of using the aforementioned bandwidths supported by LTE only. The bandwidth of each CC can be individually determined. It is possible to perform an asymmetrical carrier aggregation, which means that the number of DL CC and the number of UL CC is different from each other. DL CC/UL CC link can be configured to be fixed in a system or to be semi-static. For instance, as shown in FIG. 6 (a), in case that there exist 4 DL CCs and 2 UL CCs, it may be possible to configure a DL-UL linkage corresponding to DL CC:UL CC=2:1. Similarly, as shown in FIG. 6 (b), in case that there exist 2 DL CCs and 4 UL CCs, it may be possible to configure the DL-UL linkage corresponding to DL CC:UL CC=1:2. Unlike the drawing, it is able to configure a symmetrical carrier aggregation, which means that the number of DL CC and the number of UL CC are identical to each other. In this case, it is possible to configure the DL-UL linkage corresponding to DL CC:UL CC=1:1.

Although a whole bandwidth of a system is configured with N number of CC, a frequency band capable of being monitored/received by a specific user equipment can be limited to M (<N) number of CC. Various parameters for a carrier aggregation can be configured cell-specifically, UE group-specifically, or UE-specifically. Meanwhile, control information can be configured to be transceived only on a specific channel. The specific channel can be called a primary CC (PCC) and the rest of CCs can be called secondary CCs (SCCs).

LTE-A uses a cell concept to manage a radio resource. The cell is defined as a combination of a DL and UL resource and the UL resource is not a mandatory element. Hence, a cell can be configured with the DL resource alone or can be configured with the DL resource and the UL resource. In case of supporting the carrier aggregation, a linkage between a carrier frequency of the DL resource (or, DL CC) and a carrier frequency of the UL resource (or, UL CC) can be indicated by system information. A cell operating on a primary frequency (or, PCC) is called a primary cell (Pcell) and a cell operating on a secondary frequency (or, SCC) is called a secondary cell (Scell).

The Pcell is used for a user equipment to perform an initial connection establishment process or a connection re-establishment process. The Pcell may correspond to a cell indicated in the process of a handover. The Scell can be configured after an RRC (radio resource control) connection is established and can be used to provide an additional radio resource. Both the Pcell and the Scell can be commonly called a serving cell. Hence, in case of a user equipment not configured with the carrier aggregation while staying in a state of RRC_CONNECTED or the user equipment not supporting the carrier aggregation, there exists only one serving cell configured as a Pcell. On the contrary, in case of a user equipment configured with the carrier aggregation and staying in a state of RRC_CONNECTED, there exists at least one serving cell. And, the Pcell and the whole of the Scells are included in the whole of the serving cell. For the carrier aggregation, after an initial security activation process is started, a network may be able to configure at least one Scell for a carrier aggregation supportive user equipment in addition to the Pcell, which is initially configured in the connection establishment process.

Unlike a legacy LTE system using a single carrier, the carrier aggregation using a plurality of component carriers needs a method of efficiently managing the component carriers. In order to efficiently manage the component carriers, the component carriers can be classified according to a role and property of the component carriers. In the carrier aggregation, multiple carriers can be divided into a primary component carrier (PCC) and a secondary component carrier (SCC) and this may correspond to a UE-specific parameter.

The primary component carrier is a component carrier playing a role of a center of managing the component carriers in case of using a plurality of component carriers. One primary component carrier is defined for each of user equipments. The primary component carrier may play a role of a core carrier managing all aggregated component carriers. The secondary component carrier may play a role of providing an additional frequency resource to provide a higher transfer rate. For instance, a base station is able to perform an access (RRC) for signaling a user equipment via the primary cell. In order to provide information necessary for security and a higher layer, the primary cell can be used as well. In practical, if there exists a single component carrier only, the corresponding component carrier will become a primary component carrier. In this case, the component carrier may be able to play a role identical to that of a carrier of a legacy LTE system.

Among a plurality of component carriers, a base station can assign an activated component carrier (ACC) to a user equipment. The user equipment is aware of the activated component carrier (ACC) assigned to the user equipment in advance via a signaling and the like. The user equipment collects responses for a plurality of PDCCHs received from a DL PCell and DL Scells and can transmit the responses on PUCCH via an UL PCell.

In the following description, determination for a user equipment to transmit PUSCH in 3GPP LTE/LTE-A system is described. The following Formula 1 is a Formula to determine transmit power of a user equipment in case that PUSCH is transmitted only while PUCCH is not simultaneously transmitted in a subframe index i of a serving cell c in a CA supportive system.

[Formula 1]

$$P_{PUSCH,c}(i) = \min \left\{ \begin{array}{l} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{array} \right\}$$

[dBm]

[Formula 2]

$$P_{PUSCH,c}(i) = \min$$

$$\left\{ \begin{array}{l} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(i) + \alpha_c(j) \cdot PL_c + \Delta_{TF,c}(i) + f_c(i) \end{array} \right\}$$

[dBm]

The above-mentioned Formula 2 is a Formula to determine transmit power of a user equipment in case that PUCCH and PUSCH are simultaneously transmitted in a subframe index i of a serving cell c in a CA supportive system.

Parameters described in the Formula 1 and the Formula 2, which are necessary for determining an UL transmit power of a user equipment, relate to the serving cell c.

In this case, $P_{CMAX,c}(i)$ of the Formula 1 indicates transmittable maximum transmit power of a user equipment in the subframe index i and $\hat{P}_{CMAX,c}(i)$ of the Formula 2 indicates a linear value of $P_{CMAX,c}(i)$. $\hat{P}_{PUCCH}(i)$ of the Formula 2 indicates a linear value of $P_{PUCCH}(i)$. In this case, $P_{PUCCH}(i)$ indicates PUCCH transmit power in the subframe index i.

In the Formula 1, $M_{PUSCH,c}(i)$ is a parameter indicating a bandwidth of PUSCH resource allocation represented by the number of resource block valid for the subframe i. This parameter is a value assigned by a base station. $P_{O\_PUSCH,c}(j)$ is a parameter configured by the sum of a cell-specific nominal component $P_{O\_NOMINAL\_PUSCH,c}(j)$ provided by an upper layer and a UE-specific component $P_{O\_UE\_PUSCH,c}(j)$ provided by an upper layer. A base station informs a user equipment of this value. $\alpha_c(j)$ indicates a pathloss compensation factor. This is a upper layer providing cell-specific parameter transmitted by a base station by 3 bits. $\alpha_c \in \{0, 0.4, 0.5, 0.6, 0.7, 0.8, 0.9, 1\}$ where j=0 or 1 and $\alpha_c(j)=1$ where j=2. A base station informs a user equipment of this value.

Pathloss ($PL_c$) is a DL pathloss (or, signal loss) estimation value calculated by a user equipment in dB unit and is represented as PLc=referenceSignalPower−higher layer filteredRSRP. In this case, referenceSignalPower can be informed to a user equipment by a base station.

$f_c(i)$ is a value indicating a current PUSCH power control adjustment state for the subframe index i and can be represented by a current absolute value or an accumulated value.

Basically, $\Delta_{TF,c}(i)$ defined by 3GPP LTE/LTE-A system is configured by a value for one codeword. For a specific codeword index, if $K_S=1.25$, it becomes $\Delta_{TF,c}(i)=10 \log_{10}((2^{BPRE \cdot K_S}-1) \cdot \beta_{offset}^{PUSCH})$. If $K_S=0$, $\Delta_{TF,c}(i)$ becomes 0. In this case, the $K_S$ may correspond to a UE-specific parameter deltaMCS-Enabled provided to a user equipment via an upper layer by a base station according to a codeword. If $K_S=0$, $\Delta_{TF,c}(i)$ becomes 0 and transmit power becomes identical to each other according to a codeword. Yet, if $K_S=1.25$, transmit power may vary depending on a codeword according to a size (or, a scheduled MCS level) of a transmission information, which is normalized by an allocated resource of each codeword. In this case, bits per resource element (BPRE) parameter can be called such a different name as an MPR and the like. In particular, if $K_S$ is not 0, $\Delta_{TF,c}(i)$ can be generated based on information quantity per unit resource (e.g., BPRE) according to each codeword.

As mentioned in the foregoing description, basically, $\Delta_{TF,c}(i)$ defined by 3GPP LTE/LTE-A system is configured by a value for one codeword. For a specific codeword index, if $K_S=1.25$, it becomes $\Delta_{TF,c}(i)=10 \log_{10}((2^{BPRE\cdot K_s}-1)\cdot\beta_{offset}^{PUSCH})$. If $K_S=0$, $\Delta_{TF,c}(i)$ becomes 0. In this case, the $K_S$ corresponds to a UE-specific parameter deltaMCS-Enabled provided to a user equipment via an upper layer by a base station. For a control data transmitted on PUSCH without UL-SCH (uplink shared channel) data, it may be represented as $BPRE=O_{CQI}/N_{RE}$. Otherwise, it may be represented as $$\sum_{r=0}^{C-1} K_r/N_{RE}.$$

In this case, $K_r$ indicates the number of code blocks, C indicates a size of a code block r, $O_{CQI}$ indicates the number of CQI bit including CRC bits, and $N_{RE}$ indicates the number of resource element determined by $N_{RE}=M_{sc}^{PUSCH-initial} \cdot N_{symb}^{PUSCH-initial}$. In this case, $N_{symb}^{PUSCH-initial}$ indicates the number of SC-FDMA symbols carrying PUSCH in an initial PUSCH transmission subframe.

For a control data transmitted on PUSCH without UL-SCH (uplink shared channel) data, it may be represented as $\beta_{offset}^{PUSCH}=\beta_{offset}^{CQI}$. Otherwise, it may correspond to 1.

As mentioned earlier, a user equipment has applied 0 or 1.25 as a $K_S$ value, which is a UE-specific parameter 'deltaMCS-Enabled', in a manner of receiving the UE-specific parameter via a higher layer signaling.

It is necessary to have an inter-cell interference cancellation (hereinafter abbreviated ICIC) scheme capable of being commonly applied to an inter-cell interference control technique between a macro cell and a pico/femto cell as well as an inter-cell interference control technique between macro cells (or, macro base stations) in a network. The ICIC scheme can also be identically applied to between such low power base stations as a pico base station, a femto base station, and the like. Hence, in a heterogeneous communication system at which various types of base stations exist, it is able to commonly apply not only a horizontal ICIC scheme for performing an interference control between base stations of an identical type but also a vertical ICIC scheme for performing an interference control between base stations of different types.

When a base station transmits a signal in DL or a user equipment transmits a signal in UL, an inter-cell interference control is performed by the ICIC scheme in a manner of adjusting transmit power for a corresponding scheduled resource. In particular, interference affecting a user equipment situating at a cell boundary in DL or UL can be reduced by lowering transmit power for a resource assigned to the user equipment situating at a cell boundary by a neighboring cell. The ICIC scheme using a transmit power control can be performed by a resource block (RB) unit in frequency domain as an example and may be performed by a subframe unit and the like in time domain as an example.

Figure 8:
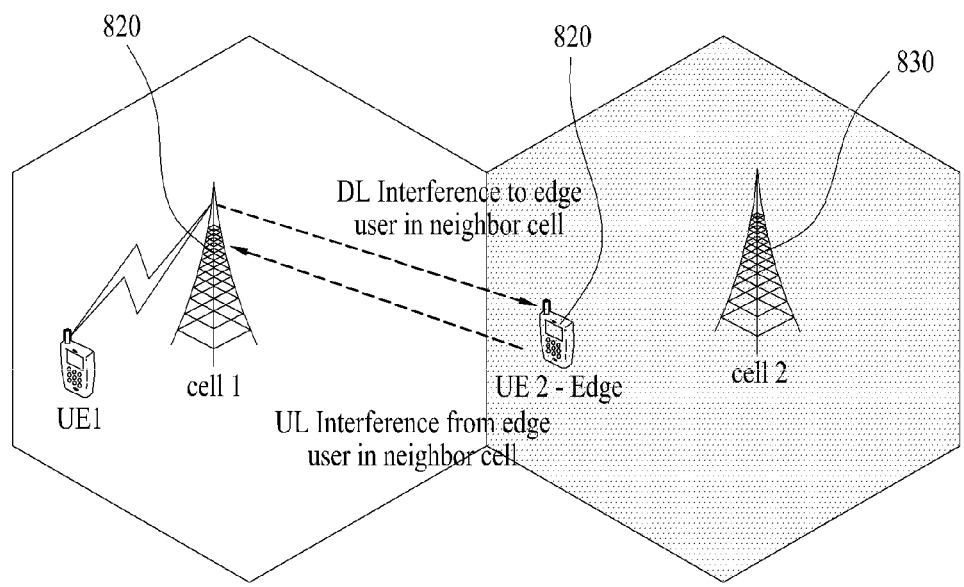
FIG. 8 is a diagram for an example of an inter-cell interference situation.

FIG. 8 is a diagram for an example of an inter-cell interference situation.

As a method of efficiently performing an inter-cell interference control technique, the present invention assumes a system to which a basic ICIC technique is applied. As depicted in FIG. 8, in case that a UE 2 820 is situated at a cell boundary, inter-cell interference affecting the UE 2 in DL/UL becomes very serious and there may exists a situation that the inter-cell interference should be reduced. Referring to FIG. 8, a cell #1 is interfering a user equipment situating at a cell boundary of a cell #2 in DL. On the contrary, the user equipment situating at a cell boundary of the cell #2 is interfering the cell #1 in UL.

In order to solve the above-mentioned situation, base stations 820/830 of each cell performs the ICIC scheme for neighboring base stations. The base stations 820/830 of each cell can perform the ICIC technique in either a frequency resource region or a time resource region based on the aforementioned resource structure. In particular, the interference affecting the neighboring base stations can be mitigated or eliminated in a manner of defining an interval where a resource is transmitted by a low transmit power in each resource region or an interval where a resource is not transmitted at all and then making the user equipment situating at a cell boundary of a neighbor cell receive a service in the interval.

The ICIC scheme can also be commonly applied to a heterogeneous network environment including various types of base stations as well as operations between the aforementioned macro base stations. For instance, the heterogeneous network means a system environment where such low power base stations as a pico cell and a femto cell coexist besides the macro base station.

A specific time unit interval can be used as a blanking interval where a signal is not transmitted. In this case, following description is explained on the basis of a subframe as an example of the specific time unit. Each base station configures a specific subframe as a blanking subframe in order not to interfere a neighboring cell. Currently, 3GPP LTE-A standard regulates a non-transmitted subframe to perform an interference control in time domain with a name of an almost blanking subframe (ABS).

Figure 9:
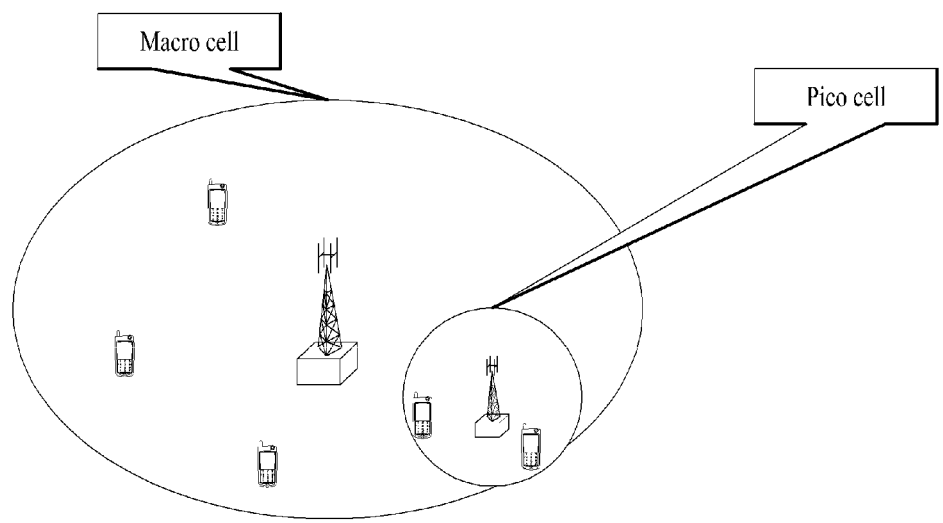
FIG. 9 is a diagram for an example of an inter-cell interference situation in a heterogeneous network environment.

FIG. 9 is a diagram for an example of an inter-cell interference situation in a heterogeneous network environment.

A heterogeneous system (or a network) means a system configured by using various types of base stations. In a heterogeneous network, a total system capacity can be maximized by managing a plurality of low power pico base stations and femto base stations of a small coverage together with a high power macro base station of a wide coverage. The pico base station is mainly installed in a hot zone requiring many data traffics and the femto base station supports such a service of a very small coverage as an individual home.

FIG. 9 shows an example of a heterogeneous network (system) configuration. When an identical carrier is simultaneously managed between base stations of different types overlaid in the heterogeneous network, interference occurs. In particular, an interference situation may occur between a macro base station and a pico base station/femto base station as well as between macro base stations. And, the interference situation can occur between a pico base station and a femto base station as well. Hence, it is necessary to have an inter-cell interference control scheme. Hence, the ICIC scheme is used not only for controlling interference between macro base stations, but also for controlling interference between a macro base station and a pico/femto base station. In this case, all techniques of the ICIC scheme used to control interference between macro base stations can be identically applied and an additional scheme may be used to optimize a performance. Moreover, if there exists a link capable of communicating between base stations although types of the base stations are different from each other, a dynamic ICIC scheme of an identical type can be applied to the base stations.

In a heterogeneous communication system at which various types of base stations exist, the present invention is able to commonly apply not only a horizontal ICIC scheme for performing an interference control between base stations of an identical type but also a vertical ICIC scheme for performing an interference control between base stations of different types.

As mentioned in the foregoing description, the ICIC scheme can be applied to a time domain and a frequency domain. A core part of the ICIC scheme is to determine a transmit power pattern in a time resource region or a frequency resource region. In particular, it is necessary to determine a frequency resource or a time resource to be transmitted with a high transmit power, an interval to be transmitted with low transmit power, or an interval to be defined as a non-transmitted interval.

A transmit power pattern or a pattern of a non-transmitted interval for an interference control can be variously configured according to a system regulation. A scheme of managing an interference control resource region and a transmit power pattern in a manner of being fixed according to a promise predetermined between base stations is called a static ICIC scheme in the present specification. And, a scheme of managing the interference control resource region and the transmit power pattern in a manner of changing according to an operation environment is called a dynamic ICIC scheme in the present specification.

In order to perform the dynamic ICIC scheme, it is necessary to exchange pattern information of transmit power according to resources between base stations and share the pattern information. According to 3GPP LTE system regulation, pattern information of transmit power according to frequency resources in DL is exchanged by such a message as a relative narrow transmit power (RNTP) of a bitmap form and pattern information of transmit power according to frequency resources in UL is exchanged by such a message as a high interference indicator (HII). In case of UL, since a severely interfering resource corresponds to a resource used by a user equipment situating at a cell boundary, information on the resource allocated to the user equipment situating at the cell boundary is exchanged by an HII message of a bitmap form. According to 3GPP LTE-A system regulation, ABS pattern information in time domain is exchanged with each other between base stations.

According to a UL power control to which a fractional pathloss compensation method is applied thereto, a pathloss compensation factor, which is one of the configuration elements of the UL power control, can be cell-specifically configured by an upper layer signaling. Since the pathloss compensation factor statically/semi-statically changes, if a user equipment moves to a cell of an isolated form or a pico cell/femto cell/RRH (remote wireless device playing a role of a very small base station), which are not acting as sources of interference to a neighboring cell, from the inside or outside of a macro cell, it is difficult to directly apply a full pathloss compensation form or an appropriate parameter for transit power of the user equipment.

The present invention is described on the basis of an isolated cell scenario, this is just an example. The present invention can be applied to a cell where transmit power of a user equipment within the cell does not affect a neighboring cell as a source of interference. In particular, an isolated cell described in the present specification may indicate a cell not interfering a neighboring cell, although the corresponding cell transmits a signal.

In a system where a radio resource is shared since a pico cell/femto cell/RRH coexist within a macro cell, a co-channel interference problem occurs depending on a method and becomes a major factor of system performance degradation. In order to solve the co-channel interference problem, when a pico UE performs a transmission in a UL subframe of the macro cell, if the UL subframe of the macro cell corresponds to an almost blanking subframe (ABS), a pathloss compensation factor among UL power control elements of the pico UE/femto UE/RRH UE is set to 1, a value identical to the macro cell, or a value different from the macro cell to determine transmit power of a UL data channel (PUSCH) and the pico UE transmits UL data using the determined transmit power. 3GPP LTE-A system standard regulates the almost blanking subframe (ABS) as a non-transmitted subframe in time domain to perform an interference control. ABS pattern information in time domain is exchanged with each other between base stations.

A method of calculating UL transmit power for a macro UE can be represented by Formula 3 as follows.

[Formula 3]

$$P_{PUSCH,c}(i) = \min \begin{Bmatrix} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{Bmatrix}$$

$$[dBm]$$

Each transmit power parameter defined by Formula 3 has a meaning identical to that of the parameters explained in the Formula 1 and the Formula 2.

While using $\alpha_c(j)$ in a manner of setting with a value less than 1, if a user equipment transmits data in an isolated pico cell, UL transmit power can be determined by setting $\alpha_c(j)$ with 1 or a different setting value. Or, it may be able to apply a value set by adding j value of $\alpha_c(j)$. According to a related art, 'j' corresponds to '0', '1', or '2'. '0' is used for a semi-persistent grant, '1' is used for a dynamic scheduled grant, and '2' is used for a random access response grant. In this case, if 'j=3' is additionally set and data is transmitted in a corresponding pico cell/RRH/femto cell, UL transmit power for UL data channel transmission is determined by using the $\alpha_c(j)$ value.

In the Formula 3, $P_{O\_PUSCH,c}(j)$ can be configured with a UE-specific value and a cell-specific value. If a UE moves from a macro cell to such an isolated cell as a pico cell/RRH/femto cell, the UE-specific value of $P_{O\_PUSCH,c}(j)$ different from that of the macro cell is applied. The above-mentioned two elements are informed to the UE by a base station via an upper layer signaling. Hence, if the UE moves to a pico cell/RRH/femto cell, the corresponding pico cell/RRH/femto cell commonly or UE-specifically informs the UE of the two elements in order for the UE to adaptively use the two elements like the $\alpha_c(j)$. Both of the two values or one of them is informed as a value to be used by the pico cell/RRH/femto cell or an offset value to be added is informed.

Following Formula 4 is a Formula for explaining a different embodiment of a method of determining PUSCH transmit power in consideration of a pathloss compensation factor.

[Formula 4]

$$P_{PUSCH,c}(i) = \min$$
$$\left\{ \begin{array}{l} P_{CMAX,c}(i), \\ 10\log_{10}(M_{PUSCH,c}(i)) + P_{O\_PUSCH,c}(j) + \alpha_c(j) \cdot \beta_c(j) \cdot PL_c + \Delta_{TF,c}(i) + f_c(i) \end{array} \right\}$$

In the Formula 4, a pathloss compensation factor can be applied in a manner of being configured by $\alpha_c(j) \cdot \beta_c(j)$ form. $\alpha_c(j)$ is a parameter value used for a macro cell and $\beta_c(j)$ becomes a parameter for a pico cell/RRH/femto cell. For instance, when the $\alpha_c(j)$ corresponds to 1 in a macro cell, the $\beta_c(j)$ may correspond to a parameter for the pico cell/RRH/femto cell. Unlike the Formula 4, the pathloss compensation factor can be represented as the $\beta_c(j)$ form taken into account a $\alpha_c(j)$ value instead of being represented as the $\alpha_c(j) \cdot \beta_c(j)$ form.

Since transmit power of a base station or a user equipment in an isolated cell can be excluded from working as interference to a base station signal or a user equipment signal of a neighboring cell, performance of a pico cell/RRH/femto cell can be enhanced in a manner of performing a full power loss compensation and then sufficiently assigning necessary transmit power.

In FIG. 9, configuration of a macro cell and a pico cell is briefly described. The macro cell and the pico cell can use one radio resource. Moreover, the macro cell and the pico cell can use one or more radio resources. In the following description, assume that the macro cell and the pico cell use one radio resource.

Figure 10:
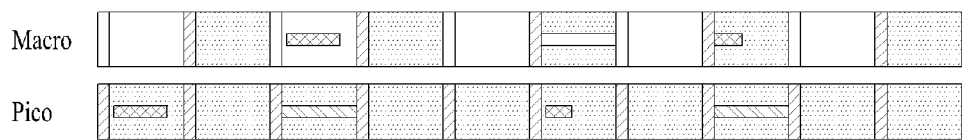
FIG. 10 is an exemplary diagram for explaining a downlink eICIC solution in a configuration depicted in FIG. 9.

FIG. 10 is an exemplary diagram for explaining a downlink eICIC solution in a configuration depicted in FIG. 9.

Referring to FIG. 10, as a part of an enhanced inter-cell interference coordination (eICIC), there is a method of using a time division multiplexing (TDM) of cell-layers in DL as an example of a non-CA (carrier aggregation) based solution as depicted in FIG. 10. This is a method of not allocating a part or the whole of resource in a manner that a base station of a macro cell configures a DL subframe of the macro cell as an almost blanking subframe (ABS). By doing this, a DL signal of the macro cell, which works as a big source of interference to a DL signal of a pico cell, is mitigated, thereby enhancing a reception performance of a user equipment in the pico cell.

Figure 11:
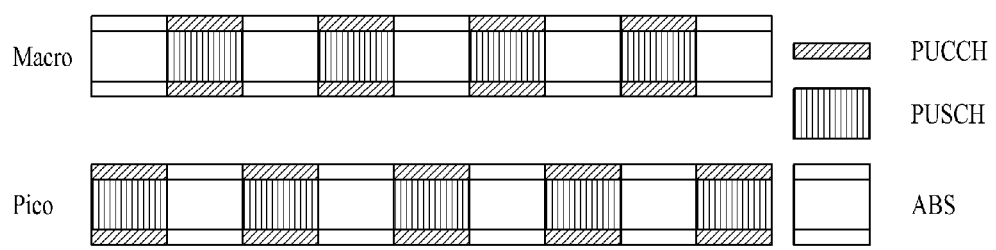
FIG. 11 is an exemplary diagram for explaining an uplink eICIC solution in a configuration depicted in FIG. 9.

In the same vein, the macro cell and the pico cell can use a radio resource by the TDM scheme as depicted in FIG. 11 in relation to a UL transmission interval.

FIG. 11 is an exemplary diagram for explaining an uplink eICIC solution in a configuration depicted in FIG. 9.

In case that a user equipment of a macro cell performs a transmission in the vicinity of a pico cell in a UL transmission interval, it may cause a significant interference to a UE signal of the pico cell. In order to mitigate or eliminate the interference for the pico cell, an ABS can be applied to the UL transmission interval of the macro cell as depicted in FIG. 11. Referring to FIG. 11, the macro cell and the pico cell can schedule UEs in each cell to transmit a signal in an UL interval different from each other. In particular, inter-cell interference can be eliminated or mitigated in a manner that a UE of the macro cell and a UE of the pico cell transmit a UL signal in a UL transmission interval different from each other. Based on this, a method of using a part or the whole of resources in the macro cell and the pico cell can be applied in various ways. As depicted in FIG. 11, the macro cell sets a UL transmission interval to an ABS in the UL transmission interval of pico cell UEs. Similarly, the pico cell sets a UL transmission interval to an ABS in the UL transmission interval of a macro cell UE.

Figure 12:
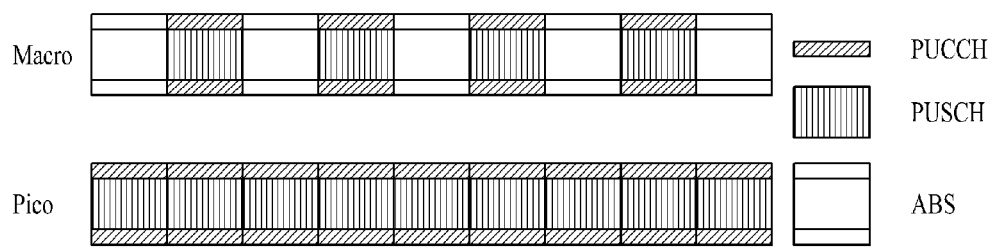
FIG. 12 is a different exemplary diagram for explaining an uplink eICIC solution in a configuration depicted in FIG. 9.

FIG. 12 is a different exemplary diagram for explaining an uplink eICIC solution in a configuration depicted in FIG. 9.

While a form of the UL transmission interval of the macro cell depicted in FIG. 11 is maintained as it is, the UL transmission interval of the pico cell becomes a form of being used all UL transmission intervals. It is also possible to apply a pattern indicating whether a part of resource is used in the UL interval used by both the macro cell and the pico cell. For instance, it is a method that a macro cell UE uses PUSCH region and a pico cell UE uses PUCCH only.

In FIG. 12, the pico cell UEs can apply a full pathloss compensation factor in the ABS interval in case of determining an UL transmit power.

Although a single pico cell is depicted in FIG. 9, there may exist a plurality of pico cells. A method of applying a configuration value for pathloss compensation may vary according to a type of a pico cell. For instance, if a type of a cell corresponds to an isolated cell, full pathloss compensation is applied. Otherwise, fractional pathloss compensation is applied. A type relation of a cell can be summarized in Table 2 as follows.

TABLE 2

|  | Macro cell | Pico cell |
| --- | --- | --- |
| Case 1 | Isolated cell | Non-Isolated cell type |
| Case 2 | Isolated cell | Isolated cell |
| Case 3 | Non-Isolated cell type | Isolated cell |
| Case 4 | Non-Isolated cell type | Non-Isolated cell type |

If a macro cell or a pico cell corresponds to an isolated cell, full pathloss compensation is basically applied. Yet, in case of using a resource as depicted in FIG. 11, there is no problem. Yet, in case of using a resource as depicted in FIG. 12, it may be more efficient and helpful to control quantity of interference given to the pico cell by applying the fractional pathloss compensation instead of applying the full pathloss compensation.

A method of determining a pathloss compensation factor for a UE transmit power in a macro cell may be different from a method of applying a transmit power according to an eICIC (a method of using a resource). A pattern using a different value with a subframe level or a symbol level for pathloss compensations (or, each of power control parameters) can be designated in advance and used according to a resource allocation pattern for the eICIC. The pattern can be cell-specifically (pico-cell/RRH/femto cell), cell-commonly, or UE-specifically used. Each corresponding cell can inform UEs of information on the pathloss compensation according to the resource allocation pattern and the like by signaling with a broadcast type, a unicast type, and the like. Or, the value can be informed to the UE cell-specifically or UE-specifically according to the macro cell. Or, in accordance with a predetermined subframe set or a subframe pattern, values to be applied can be configured by a set. It is also able to configure according to a subframe or a symbol level. As an example, at least one or more can be used in a manner of being configured by a form of 'if SFN mod A=B, $\alpha$ value (or, a UE-specific value) is C'. In this case, the SFN is a value indicating a subframe number (or, an index). In this case, A, B, and C may correspond to predetermined fixed values and can be transmitted to a UE via an upper layer/dynamic grant with a semi-static/dynamic value by a cell.

When a UE moves to an isolated pico cell from a macro cell, if the pico cell type corresponds to an isolated cell, the UE can set a pathloss compensation factor to 1 (or a designated value). The macro cell may inform one, a part, or all pico cells of information on the pico cell type and the corresponding pico cell can inform the pico cell type as well. In this case, the information on the pico cell type can be informed by a broadcast message type, a unicast message type, and the like.

Meanwhile, when a UE moves to an isolated pico cell from a macro cell, a corresponding pico cell can newly inform of a pathloss compensation factor or the macro cell can inform of the pathloss compensation factor according to a pico cell. In this case, the information on the pico cell type can be informed by a broadcast message type, a unicast message type, and the like.

According to the above-mentioned embodiments of the present invention, performance of a pico cell, an RRH, a femto cell can be maximized in a situation that an eICIC is taken into consideration.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Accordingly, a method of determining an uplink transmit power in a network including a plurality of cells and an apparatus therefor are industrially applicable to various mobile communication systems including 3GPP LTE, LTE-A system, and the like.

What is claimed is:

1. A method of determining uplink transmit power by a user equipment in a heterogeneous network including heterogeneous cells, the method comprising:
receiving information including a cell type of a cell of the heterogeneous cells, wherein the cell type indicates whether the cell of the heterogeneous cells causes interference with a neighboring cell,
receiving information containing a pathloss compensation factor value corresponding to the cell type of the cell of the heterogeneous cells,
wherein the pathloss compensation factor value for the cell corresponding to the cell type is set to a full pathloss compensation factor value when the cell type indicates that the cell of the heterogeneous cells does not cause interference with the neighboring cell, and
wherein the pathloss compensation factor value for the cell of the heterogeneous cells is set to a fractional pathloss compensation factor value when the cell type indicates that the cell of the heterogeneous cells causes interference with the neighboring cell;
determining a physical uplink shared channel (PUSCH) transmission power using the full pathloss compensation factor value when the UE is located within the cell of the heterogeneous cells and when the cell type indicates that the cell of the heterogeneous cells does not cause interference with the neighboring cell;
determining a PUSCH transmission power using the fractional pathloss compensation factor value when the UE is located within the cell of the heterogeneous cells and when the cell type indicates that the cell of the heterogeneous cells causes interference with the neighboring cell; and
transmitting the PUSCH using the determined PUSCH transmission power.

2. The method of claim 1, wherein the cell comprises a pico cell or a femto cell.

3. The method of claim 1, wherein a subframe in a neighboring cell corresponding to a subframe assigned for transmission of the PUSCH in the cell is configured as an Almost Blanking Subframe (ABS).

4. The method of claim 1, wherein the information including the cell type of the cell is transmitted as a type of unicast message or a broadcast message.

5. The method of claim 1, wherein the cell and a neighboring cell operate on a same carrier.

6. The method of claim 1, wherein a neighboring cell comprises a macro cell.

7. A user equipment for determining uplink transmit power in a heterogeneous network including heterogeneous cells, the user equipment comprising:
a receiver configured to:
receive information including a cell type of a cell of the heterogeneous cells, wherein the cell type indicates whether the cell of the heterogeneous cells causes interference with a neighboring cell,
receive information containing a pathloss compensation factor value corresponding to the cell type of the cell of the heterogeneous cells,
wherein the pathloss compensation factor value for the cell of the heterogeneous cells is set to full pathloss compensation factor value when the cell type indicates that the cell of the heterogeneous cells does not cause interference with a neighboring cell,
wherein the pathloss compensation factor value for the cell of the heterogeneous cells is set to a fractional pathloss compensation factor value when the cell type indicates that the cell of the heterogeneous cells causes interference with the neighboring cell;
a processor configured to:
determine a physical uplink shared channel (PUSCH) transmission power using the full pathloss compensation factor value when the UE is located within the cell of the heterogeneous cells and when the cell type indicates that the cell of the heterogeneous cells does not cause interference with the neighboring cell, and determine a PUSCH transmission power using the fractional pathloss compensation factor value when the UE is located within the cell of the heterogeneous cells and when the cell type indicates that the cell of the heterogeneous cells causes interference with the neighboring cell; and a transmitter configured to transmit the PUSCH using the PUSCH transmission power.

8. The user equipment of claim 7, wherein the cell comprises a pico cell or a femto cell.

9. The user equipment of claim 8, wherein a neighboring cell comprises a macro cell.

* * * * *